US012229656B2

(12) United States Patent
Choi et al.

(10) Patent No.: US 12,229,656 B2
(45) Date of Patent: Feb. 18, 2025

(54) METHOD AND APPARATUS FOR PERFORMING CONVOLUTION OPERATION FOR OPTIMIZING ARITHMETIC INTENSITY OF DEVICE

(71) Applicant: NOTA, INC., Daejeon (KR)

(72) Inventors: Shin Kook Choi, Seoul (KR); Jun Kyeong Choi, Seoul (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 18/355,008

(22) Filed: Jul. 19, 2023

(65) Prior Publication Data

US 2024/0028875 A1    Jan. 25, 2024

(30) Foreign Application Priority Data

Jul. 20, 2022   (KR) .................. 10-2022-0089835
Nov. 22, 2022  (KR) .................. 10-2022-0157421

(51) Int. Cl.
*G06N 3/0464* (2023.01)

(52) U.S. Cl.
CPC ................... *G06N 3/0464* (2023.01)

(58) Field of Classification Search
CPC ................... G06N 3/0464; G06N 3/063
See application file for complete search history.

(56) References Cited

U.S. PATENT DOCUMENTS

2021/0366080 A1\* 11/2021 Jung ............ G06T 3/4046

FOREIGN PATENT DOCUMENTS

| KR | 10-2020-0095300 A | 8/2020 |
|---|---|---|
| KR | 10-2021-0113004 A | 9/2021 |
| KR | 10-2432254 B1 | 8/2022 |
| KR | 10-2452953 B1 | 10/2022 |

OTHER PUBLICATIONS

Kosaian et al., "Arithmetic-Intensity-Guided Fault Tolerance for Neural Network Inference on GPUs", Nov. 19, 2021, SC '21, pp. 1-15. (Year: 2021).\*
Perry Gibson et al., "Optimizing Grouped Convolutions on Edge Devices", 2020 IEEE 31st International Conference on Application-specific Systems, Architectures and Processors (ASAP), 2020, pp. 189-196.

\* cited by examiner

*Primary Examiner* — Brent Johnston Hoover
(74) *Attorney, Agent, or Firm* — Sughrue Mion, PLLC

(57) ABSTRACT

Provided are a method and apparatus for performing a convolution operation for optimizing the arithmetic intensity of device. The method includes obtaining input data, and generating output data through a convolution model for a device, by using the input data, wherein the convolution model includes a plurality of convolutional layers, the plurality of convolutional layers include an improved first convolutional layer that satisfies preset conditions related to latency characteristics of the device, the improved first convolutional layer is a layer obtained by adjusting a first convolutional layer so as to perform a first convolution operation on a first feature map, which is obtained by reshaping an input feature map of the first convolutional layer based on a predetermined final division value, and the final division value is determined considering the latency characteristics such that an overall arithmetic intensity of the improved first convolutional layer is increased compared to the first convolutional layer.

20 Claims, 11 Drawing Sheets

FIG. 4A

| | MACs ($M_c$) | Weight size (W) | Activation size (A) | Arithmetic intensity Weight ($M_c/W$) | Arithmetic intensity Activation ($M_c/A$) |
|---|---|---|---|---|---|
| 410 — Standard conv | $S_o^2 k^2 C_{in} C_{out}$ | $k^2 C_{in} C_{out}$ | $S_o^2 (C_{in} + C_{out})$ | $S_o^2$ | $\dfrac{k^2 C_{in} C_{out}}{C_{in} + C_{out}}$ |
| 420 — Group conv | $\dfrac{S_o^2 k^2 C_{in} C_{out}}{g}$ | $\dfrac{k^2 C_{in} C_{out}}{g}$ | $S_o^2 (C_{in} + C_{out})$ | $S_o^2$ | $\dfrac{k^2 C_{in} C_{out}}{g(C_{in} + C_{out})}$ |
| 430 — ABConv | $\dfrac{S_o^2 k^2 C_{in} C_{out}}{g}$ | $\dfrac{k^2 C_{in} C_{out}}{g^2}$ | $S_o^2 (C_{in} + C_{out})$ | $g S_o^2$ | $\dfrac{k^2 C_{in} C_{out}}{g(C_{in} + C_{out})}$ |
| 440 — ABConv-exp | $S_o^2 k^2 C_{in} C_{out}$ | $\dfrac{k^2 C_{in} C_{out}}{g}$ | $S_o^2 (C_{in} + 2g C_{mid} + C_{out})$ | $g S_o^2$ | $\dfrac{k^2 C_{in} C_{out}}{C_{in} + 2g C_{mid} + C_{out}}$ |

FIG. 4B

```
1: procedure GROUP-SELECT(S_g, k, C_in, C_out, L_in, L_out, is_exp)
2:     q_in = floor(C_in/L_in)
3:     q_out = floor(C_out/L_out)
4:     r_in = C_in/L_in - q_in
5:     r_out = C_out/L_out - q_out
6:     if (r_in == 0)&(r_out == 0) then
7:         if is_exp == False then
```

$$g_{opt} = \sqrt{\frac{k^2 C_{in} C_{out}}{S_g^2 (C_{in} + C_{out})}}$$

```
9:         else
```

$$g_{opt} = \frac{-C_{in} - C_{out} + \sqrt{(C_{in} + C_{out})^2 + \frac{8(C_{in} + k^2 C_{out})C_{out}^2}{S_g^2}}}{4C_{out}}$$

```
11:        end if
12:        G = Common divisor(q_in, q_out)
13:        g = G[argmin(|G - g_opt|)]
14:        if g == 1 then
15:            sw_reg = False
16:        else
17:            sw_reg = True
18:        end if
19:    else
20:        g = 1, sw_reg = False
21:    end if
22:    return g, sw_reg
23: end procedure
```

METHOD AND APPARATUS FOR PERFORMING CONVOLUTION OPERATION FOR OPTIMIZING ARITHMETIC INTENSITY OF DEVICE

CROSS-REFERENCE TO RELATED APPLICATION

This application is based on and claims priority under 35 U.S.C. § 119 to Korean Patent Application Nos. 10-2022-0089835, filed on Jul. 20, 2022, 10-2022-0157421, filed on Nov. 22, 2022, in the Korean Intellectual Property Office, the disclosure of which is incorporated by reference herein in its entirety.

BACKGROUND

1. Field

The present disclosure relates to a method and apparatus for performing a convolution operation for optimizing the arithmetic intensity of device.

2. Description of the Related Art

Convolutional neural networks (CNNs) are models that extract a feature map by using a plurality of convolutional layers and reduces dimensionality through subsampling to obtain only important parts from the feature map. CNNs are essential in various industries, such as image classification, object detection, or image segmentation.

However, a CNN is based on numerous model parameters and computations, an improvement in the performance of the CNN results in a larger model size, amount of computation, and memory footprint. Therefore, it is difficult to use CNNs on devices with limited computational performance, such as mobile devices, autonomous vehicles, or edge computing devices.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

SUMMARY

Provided are methods and apparatuses for performing a convolution operation for optimizing the arithmetic intensity of device. Technical objectives of the present disclosure are not limited to the foregoing, and other unmentioned objects or advantages of the present disclosure would be understood from the following description and be more clearly understood from the embodiments of the present disclosure. In addition, it would be appreciated that the objectives and advantages of the present disclosure can be implemented by means provided in the claims and a combination thereof.

Additional aspects will be set forth in part in the description which follows and, in part, will be apparent from the description, or may be learned by practice of the presented embodiments of the disclosure.

According to a first aspect of the present disclosure, a method of performing a convolution operation, which is performed by an apparatus, includes obtaining input data, and generating output data through a convolution model for a device, by using the input data, wherein the convolution model includes a plurality of convolutional layers, the plurality of convolutional layers include an improved first convolutional layer that satisfies preset conditions related to latency characteristics of the device, the improved first convolutional layer is a layer obtained by adjusting a first convolutional layer so as to perform a first convolution operation on a first feature map, which is obtained by reshaping an input feature map of the first convolutional layer based on a predetermined final division value, and the final division value is determined considering the latency characteristics such that an overall arithmetic intensity of the improved first convolutional layer is increased compared to the first convolutional layer.

According to a second aspect of the present disclosure, an apparatus for performing a convolution operation includes a memory storing at least one program, and a processor configured to executing the at least one program to perform an operation, wherein the processor is further configured to obtain input data, generate output data through a convolution model for a device, by using the input data, the convolution model includes a plurality of convolutional layers, the plurality of convolutional layers include an improved first convolutional layer that satisfies preset conditions related to latency characteristics of the device, the improved first convolutional layer is a layer obtained by adjusting a first convolutional layer so as to perform a first convolution operation on a first feature map, which is obtained by reshaping an input feature map of the first convolutional layer based on a predetermined final division value, and the final division value is determined based on the latency characteristics such that an overall arithmetic intensity of the improved first convolutional layer is increased compared to the first convolutional layer.

According to a third aspect of the present disclosure, a computer-readable recording medium may have recorded thereon a program for causing a computer to execute the method according to the first aspect.

In addition, other methods and devices for implementing the present disclosure, and a computer-readable recording medium having recorded thereon a program for executing the method may be further provided.

Other aspects, features, and advantages other than those described above will be apparent from the following drawings, claims, and detailed description.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a diagram showing data reuse characteristics of a convolutional layer, according to an embodiment;

FIG. 4B shows an algorithm for determining a division value, according to an embodiment;

DETAILED DESCRIPTION

Figure 1:
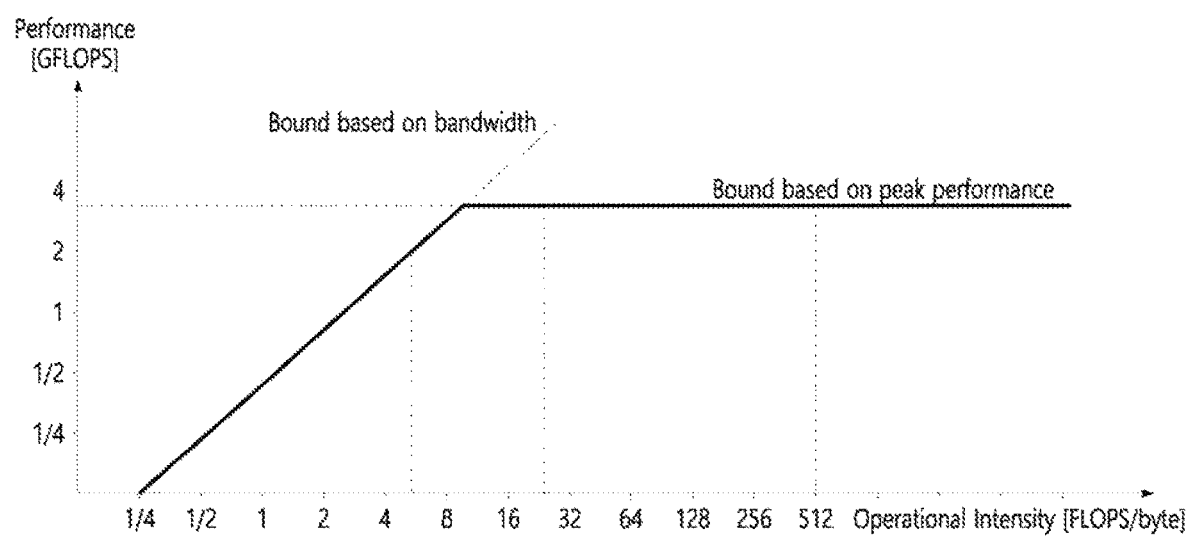
FIG. 1 is a graph illustrating a Roofline model of device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. A singular expression also includes the plural meaning as long as it is not inconsistent with the context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of device and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors. Furthermore, the present disclosure may employ known technologies for electronic settings, signal processing, and/or data processing. Terms such as "mechanism", "element", "unit", or "component" may be used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

Hereinafter, the present disclosure will be described in detail with reference to the accompanying drawings.

FIG. 1 is a graph illustrating a Roofline model of device according to an embodiment.

A Roofline model is a visual model that intuitively shows the performance of device, and represents the unique characteristics of the device.

The x-axis represents the arithmetic intensity. The arithmetic intensity is defined as the number of arithmetic operations performed per byte. That is, the arithmetic intensity refers to the ratio of floating point operations (flops) to the total data transfer size. The y-axis represents the performance of the device. In the Roofline model, the performance is defined as the number of arithmetic operations performed per hour, and is expressed in [Flops/s].

When both the x-axis and the y-axis are in logarithmic scale, the graph has the shape of a roof, and thus is called a Roofline model.

Referring to FIG. 1, the graph may be divided into a flat section and an inclined section. The sloped section is referred to as a memory bound, and the flat section is referred to as a computation bound.

The y value of the flat section refers to the best performance of the device, and the y values of the inclined section are less than the y value of the flat section and thus correspond to a section in which the device is not in its best performance. This is because the performance is limited by a memory bandwidth being low due to a low arithmetic intensity. Therefore, as the length of the inclined section increases, the memory bandwidth may be more limited.

As described above, the ratio of performance to arithmetic intensity may be obtained from a Roofline model of certain device, and thus, the Roofline model may be used to estimate an optimal point of the performance of the device or to estimate the performance of a computing kernel or an application.

Figure 2:
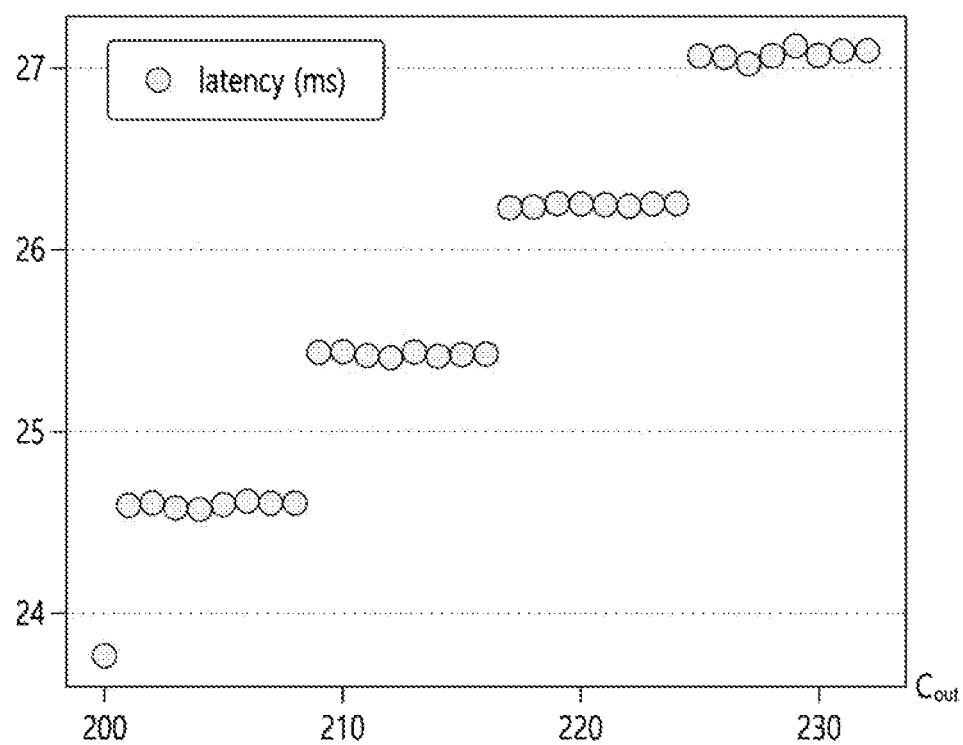
FIG. 2 is a diagram for describing latency characteristics of device according to an embodiment.

FIG. 2 is a diagram for describing latency characteristics of device according to an embodiment.

The number of channels is an important hyperparameter that is adjusted for efficient neural network design, and the latency characteristic of device refers to a latency (in ms) that occurs in the device as the number of channels of a CNN increases.

For example, when the x-axis is $C_{out}$, the latency characteristic refers to a change in latency that occurs when only $C_{out}$ is adjusted while other hyperparameters are fixed, and similarly, when the x-axis is $C_{in}$, the latency characteristic refers to a change in latency that occurs when only $C_{in}$ is adjusted while other hyperparameters are fixed.

Referring to FIG. 2, it may be seen that, as the number of channels that is represented by the x-axis increases, the latency that is represented by the y-axis increases in a staircase pattern rather than in proportion to the number of channels.

The complexity of a convolution operator is linear, and thus, it is expected that a measured latency will also have a linear relationship with $C_{out}$ or $C_{in}$, however, it may be seen that the actually measured latency does not increase linearly as the number of channels increases, but increases in the staircase pattern.

Figure 3A:
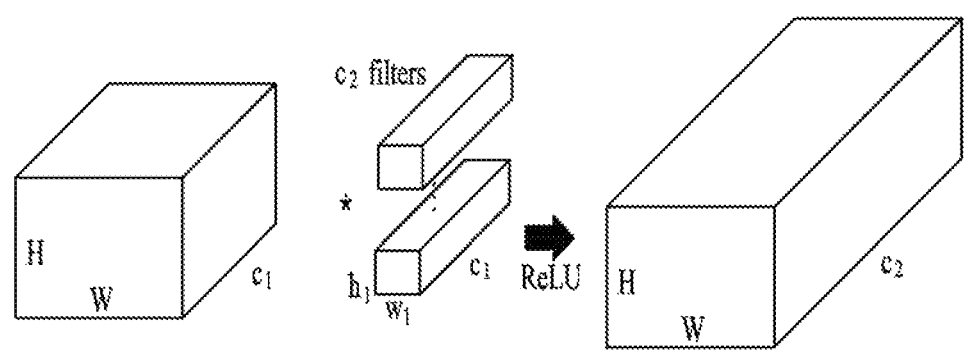
FIGS. 3A and 3B are diagrams illustrating a standard convolution operation and a group convolution operation, according to an embodiment.
Figure 3B:
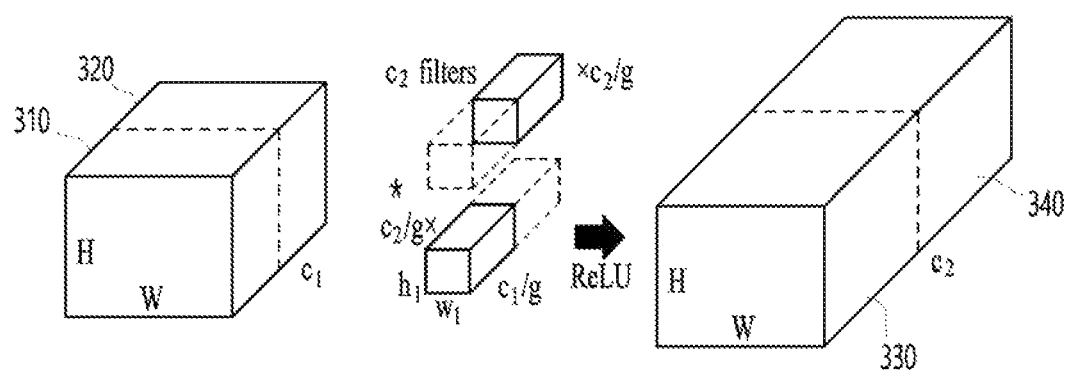

FIGS. 3A and 3B are diagrams illustrating a standard convolution operation and a group convolution operation, according to an embodiment.

FIG. 3A shows a schematic method of a standard convolution operation.

A convolutional layer in which a convolution operation is performed extracts a feature map from data, reduces the dimensionality of the data through subsampling, and thus extracts only important parts from the feature map.

The convolution operation is an operation that multiplies one function by values obtained by inverting and shifting another function, and performs an integration over an interval to obtain a new function. In detail, when a convolution operation is used in a convolutional layer, an operation that, while shifting a tensor (or a matrix) called a kernel (or a filter) from the starting point to the ending point of a feature map having a size of height×width, multiplies an image of a part that overlaps with the size of the kernel, by the element values of the kernel, and outputs the sum of all of the products.

When the size of an input channel is H×W, the number of input channels is C, the number of output channels is M, and the size of the kernel is $K_2$, the total number of parameters of the convolution operation is $K^2CM$, and the amount of computation of the convolution operation is $(K^2CM)HW$.

Referring to FIG. 3B, a method of performing a group convolution operation is a method of performing independent convolution operations on sub-input channels 310 and 320 obtained by dividing an input channel into several channel groups. Sub-output channels 330 and 340 may be generated as a result of the group convolution operation.

The number of sub-input channels is determined by a division value by which an input channel is divided. For example, FIG. 3B shows an example in which the division value is 2, but the division value is not limited thereto.

Meanwhile, when the size of the input channel is H×W, the number of input channels is C, the number of output channels is M, the size of the kernel is $K^2$, and the division value is g, the number of channels of each of the sub-input channels 310 and 320 is $$\frac{C}{g},$$

and the number of channel's or each of the sub-output channels 330 and 340 is $$\frac{M}{g}.$$

Thus, the number of parameters of each of the sub-input channels 310 and 320 is $$K^2 \frac{C}{g} \frac{M}{g}$$

and the number of the sub-input channels 310 and 320 is g, which is the division value, and thus, the total number of parameters of the group convolution operation is $$\frac{K^2CM}{g},$$

and accordingly, the amount of computation of the group convolution operation is $$\frac{(K^2CM)HW}{g}.$$

Compared to the standard convolution operation shown in FIG. 3A, it may be seen that the number of parameters and the amount of computation of the group convolution operation are 1/g times those of the standard convolution, respectively.

In addition, the group convolution operation enables learning of channels having a high correlation to each of the sub-input channels 310 and 320, and is advantageous for parallel processing. However, the division value g is a hyperparameter, the performance may change according to g, and when g is excessively large, each layer cannot have a sufficient number of channels as an input. Therefore, it is important to select an appropriate value for g.

FIG. 4A is a diagram showing data reuse characteristics of a convolutional layer, according to an embodiment.

Referring to FIG. 4A, the first row of a table 400 represents values for a standard convolution operation 410, the second row represents values for a group convolution operation 420, the third row represents values for an arithmetic intensity balanced convolution (ABConv) operation 430, the fourth row represents values for an expanded arithmetic intensity balanced convolution (ABConv-exp) operation 440, the first column represents the number of multiply-accumulate operations ($M_C$) 401, the second column represents a weight size W 402, and the third column represents an activation size A 403 for an input feature map and an output feature map. Here, the overall arithmetic intensity ($M_C/(W+A)$) may consist of a weight arithmetic intensity ($M_C/W$) 404 and an activation arithmetic intensity ($M_C/A$) 405, which are represented in the fourth and fifth columns, respectively.

Because the arithmetic intensity refers to the degree of data reuse, as the overall arithmetic intensity ($M_C/(W+A)$) increases, the device may perform more efficient computation. Here, the overall arithmetic intensity ($M_C/(W+A)$) may be divided into reuse characteristics for activation data and reuse characteristics for weight data. In detail, the weight arithmetic intensity is an arithmetic intensity reflecting the reuse characteristics for the activation data, and the weight arithmetic intensity is an arithmetic intensity reflecting the reuse characteristics for the weight data.

The overall arithmetic intensity ($M_C/(W+A)$) has mathematical upper bounds, which is the weight arithmetic intensity ($M_C/W$) 404 and the activation arithmetic intensity ($M_C/A$) 405. Thus, as the weight arithmetic intensity 404 and the activation arithmetic intensity 405 decrease, the upper limit of the overall arithmetic intensity decreases. In addition, referring to FIG. 4A, it may be seen that the weight arithmetic intensity 404 is determined by a spatial size $S_0$, which is the size of the input channel, and the activation arithmetic intensity 405 is determined by a kernel size k, the number $C_{in}$ of input channels, and the number $C_{out}$ of output channels. Recently, with an increase in the depth of convolutional layer-based neural networks, the neural networks are designed to reduce the spatial size and increase the channel size, such the weight arithmetic intensity are significantly reduced.

Meanwhile, it may be seen that the activation arithmetic intensity 405 of the group convolution operation 420 is 1/g times the activation arithmetic intensity 405 of the standard convolution operation 410. In addition, it may be seen that the weight arithmetic intensity $gS_0^2$ 404 of the ABConv operation 430 is g times the weight arithmetic intensity 404 of the standard convolution operation 410, and the activation arithmetic intensity $$\frac{k^2 C_{in} C_{out}}{g(C_{in} + C_{out})}$$

405 of the ABConv operation 430 is 1/g times the activation arithmetic intensity 405 of the standard convolution operation 410.

According to the Roofline model of the device described above, in the inclined section, the arithmetic intensity needs to be increased to increase the performance of the device. Thus, as the weight arithmetic intensity 404 determined by the spatial size decreases, the overall arithmetic intensity in which the weight arithmetic intensity 404 serves as an upper bound decreases, and accordingly, the performance of the device may decrease. Thus, when the spatial size is small, it is necessary to increase the weight arithmetic intensity 404 to increase the overall arithmetic intensity and thus increase the performance of the device.

However, when the weight arithmetic intensity 404 is excessively increased, the activation arithmetic intensity 405 may decrease, resulting in a decrease in the overall arithmetic intensity, and thus, in order to maximize the overall arithmetic intensity, a method of tuning the weight arithmetic intensity 404 and the activation arithmetic intensity 405 in a balanced manner is required. By using such a method, a latency may be reduced by increasing the performance of the device.

The ABConv operation 430 and the ABConv-exp operation 440 will be described in detail below with reference to FIGS. 5 and 6.

FIG. 4B shows an algorithm for determining a division value, according to an embodiment.

In an embodiment, an apparatus may obtain a first latency characteristic for an output channel and a second latency characteristic for an input channel, according to hardware characteristics of certain device.

Referring to lines 2 to 5 of FIG. 4B, in an embodiment, an apparatus for performing a convolution operation according to the present disclosure (hereinafter, referred to as an 'apparatus') may calculate the quotient (a first quotient) and the remainder (a first remainder) of the number of output channels divided by a first step size of the first latency characteristic, and the quotient (a second quotient) and the remainder (a second remainder) of the number of input channels divided by a second step size of the second latency characteristic. Meanwhile, the step size may depend on a hardware characteristic of the device. That is, the first step size and the second step size may depend on a hardware characteristic of the device.

Referring to line 6 of FIG. 4B, in an embodiment, the apparatus may set, as a preset condition, a first condition that the number of output channels be divisible by the first step size of the first latency characteristic, and/or a second condition that the number of input channels be divisible by the second step size of the second latency characteristic. That is, the apparatus may set, as a preset condition, the first condition that the first remainder be 0, and/or the second condition that the second remainder be 0.

Referring to lines 7 and 8 of FIG. 4B, in an embodiment, when the number of output channels satisfies the first condition and the second condition, the apparatus may calculate an optimal division value $g_{opt}$ for ABConv. In detail, referring to FIG. 4A, the calculated optimal division value $g_{opt}$ may be a value for g that causes the weight arithmetic intensity 404 and the activation arithmetic intensity 405 of the ABConv operation 430 to be equal to each other.

For example, an equation for calculating the optimal division value $g_{opt}$ for the ABConv is Equation 1 below.

$$gS_0^2 = \frac{k^2 C_{in} C_{out}}{g(C_{in} + C_{out})} \qquad \text{[Equation 1]}$$

Here, the optimal division value $g_{opt}$ for the ABConv calculated through Equation 1 is $$\sqrt{\frac{k^2 C_{in} C_{out}}{S_0^2 (C_{in} + C_{out})}}.$$

Referring to lines 9 and 10 of FIG. 4B, in another embodiment, when the number of output channels satisfies the first condition and the second condition, the apparatus may calculate an optimal division value $g_{opt}$ for ABConv-exp. In detail, referring to FIG. 4A, the calculated optimal division value $g_{opt}$ may be a value for g that causes the weight arithmetic intensity 404 and the activation arithmetic intensity 405 of the ABConv-exp operation 440 to be equal to each other.

For example, an equation for calculating the optimal division value $g_{opt}$ for the ABConv-exp is Equation 2 below.

$$gS_0^2 = \frac{k^2 C_{in} C_{out}}{C_{in} + 2g C_{mid} + C_{out}} \qquad \text{[Equation 2]}$$

Here, the optimal division value Bowe for the ABConv-exp calculated through Equation 2 is $$\frac{-C_{in} - C_{out} + \sqrt{\frac{(C_{in} + C_{out})^2 + 8(C_{in} + k^2 C_{out}) C_{mid}^2}{S_0^2}}}{4 C_{mid}}.$$

Here, $C_{mid}$ may refer to an intermediate number of output channels, which is determined such that the representation power and the amount of computation of the ABConv-exp operation are kept similar to those of a convolution operation performed by a first convolutional layer.

On the contrary, referring to lines 19 and 20 of FIG. 4B, when a convolution model does not satisfy at least one of the first condition and the second condition, the apparatus may not apply the ABConv operation or the ABConv-exp operation to the convolution operation.

Referring to lines 12 and 13 of FIG. 4B, in an embodiment, the apparatus may calculate one or more common divisors of the first quotient and the second quotient. The apparatus may determine, as a final division value, the common divisor closest to the optimal division value $g_{opt}$ among the one or more common divisors. Accordingly, when performing the convolution operation according to the final division value, the apparatus may enable the most efficient convolution operation considering the unique latency characteristics of the device for which the convolution model operates. In detail, the apparatus may enable the most efficient convolution operation such that the number of input channels and the number of output channels obtained through division according to the final division value correspond to a multiple of the first step size according to the first latency characteristic and a multiple of the second step size according to the second latency characteristic, respectively.

Meanwhile, two numbers having only one common divisor of 1 (i.e., their greatest common divisor is 1) are referred to as being relatively prime to each other. Here, when the first quotient and the second quotient are relatively prime to each other, or when the common divisor closest to the optimal division value is 1, the final division value determined according to the above process may be 1.

In an embodiment, the apparatus may set, as a preset condition, a third condition that the common divisor closest to the optimal division value $g_{opt}$ among the one or more common divisors of the first quotient and the second quotient not be 1. For example, when the final division value is not 1, the apparatus may select a first convolutional layer from among a plurality of convolutional layers. On the contrary, when the convolution model does not satisfy the third condition, the apparatus may not apply the ABConv operation or the ABConv-exp operation to the convolution operation.

Referring to lines 14 and 15 of FIG. 4B, when the convolution model does not satisfy the third condition, the apparatus may not apply the ABConv operation or the ABConv-exp operation to the convolution operation. That is, when the plurality of convolutional layers do not satisfy the third condition, the apparatus may not select the first convolutional layer from among the plurality of convolutional layers.

On the contrary, referring to lines 16 and 17 of FIG. 4B, in an embodiment, when the third condition is satisfied, the apparatus may perform the ABConv operation or the ABConv-exp operation based on the final division value.

In an embodiment, the apparatus may select the first convolutional layer that satisfies all of the first to third conditions from among the plurality of convolutional layers included in the convolution model. In other words, the preset conditions may include all of the first to third conditions, and when the convolution model satisfies all of the preset conditions, the apparatus may apply the ABConv operation or the ABConv-exp operation to the convolution operation.

According to the above-described embodiments, a layer selected by the apparatus from among the plurality of convolutional layers based on the first to third conditions may be defined as the first convolutional layer. The apparatus may obtain an improved first convolutional layer by adjusting the first convolutional layer such that the first convolutional layer performs the ABConv operation or the ABConv-exp operation.

Figure 5:
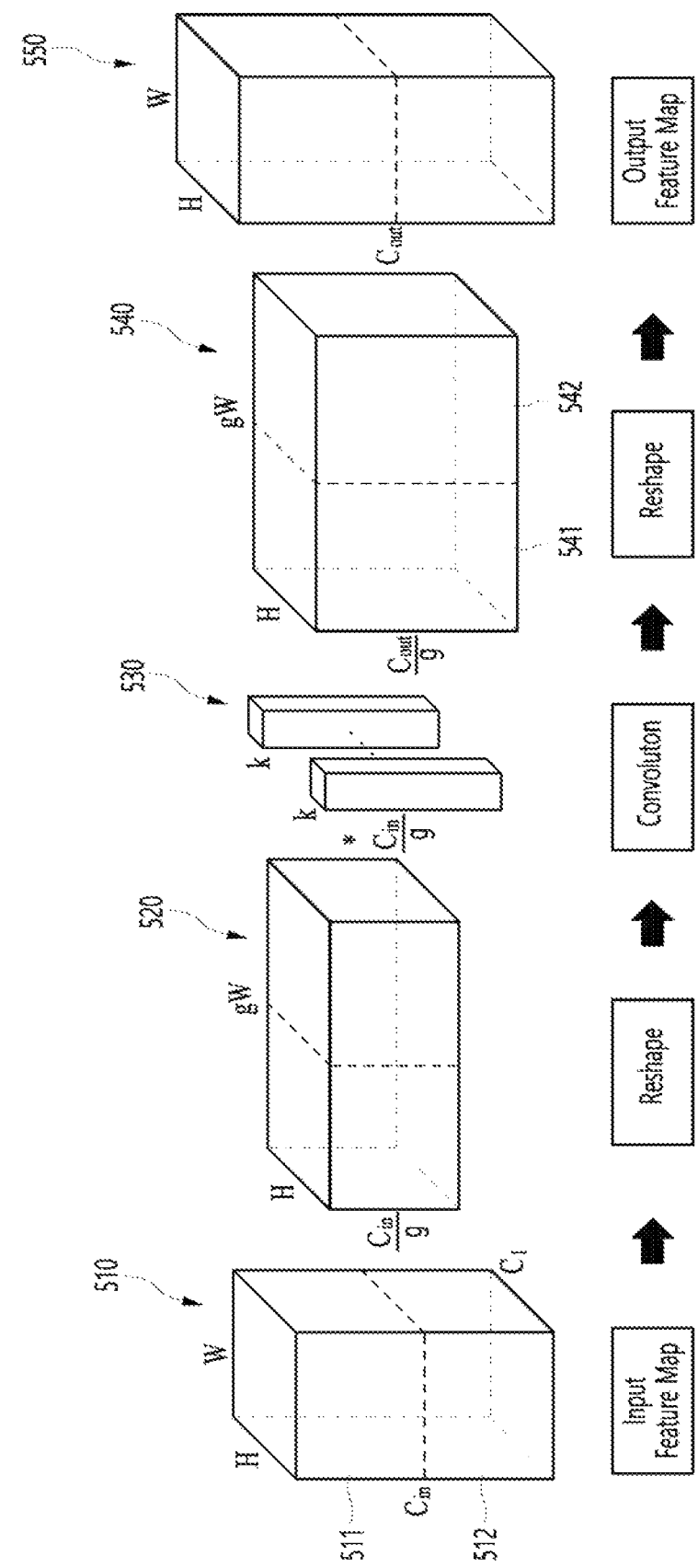
FIG. 5 is a diagram for describing a method of performing an arithmetic intensity balanced convolution operation, according to an embodiment.

FIG. 5 is a diagram for describing a method of performing an ABConv operation, according to an embodiment.

According to the method of performing an ABConv operation according to an embodiment, device performance may be increased by maximizing the overall arithmetic intensity including the weight arithmetic intensity and the activation arithmetic intensity. In addition, the method of performing an ABConv operation according to an embodiment may reduce the total amount of computation by sharing filter weights. That is, unlike the group convolution operation of FIG. 3B, an operation may be performed by sharing kernel weights.

In an embodiment, the apparatus may receive a basic convolution model that operates for certain device. Here, the basic convolution model may include a plurality of convolutional layers and a basic filter.

In an embodiment, the apparatus may select at least one convolutional layer from among the plurality of convolutional layers included in the basic convolution model. For example, the apparatus may select a convolutional layer that satisfies preset conditions from among the plurality of convolutional layers included in the basic convolution model.

In an embodiment, the apparatus may obtain the number of input channels and the number of output channels of each of the plurality of convolutional layers included in the basic convolution model. In addition, the apparatus may select a layer, that is, a first convolutional layer, to which a final division value is to be applied, from among the plurality of convolutional layers, based on a first step size of a first latency characteristic, and a second step size of a second latency characteristic. Alternatively, the apparatus may select the first convolutional layer from among the plurality of convolutional layers, based on the number of input channels and the number of output channels, in addition to the first step size and the second step size.

In an embodiment, the apparatus may generate an improved first convolutional layer that operates for the device, by determining the final division value that increases the arithmetic intensity of the first convolutional layer, and adjusting the first convolutional layer based on the determined final division value. Accordingly, the apparatus may generate an improved convolution model including the improved first convolutional layer.

Referring to the descriptions provided above, the apparatus needs to determine the final division value such that the values obtained by dividing the number of output channels and the number of input channels by the final division value are also divisible by the first step size and the second step size, respectively (the first condition and the second condition), considering the latency characteristics of the convolution model that operates for the device, and in order to improve the performance of the device, the device needs to determine the final division value such that the weight arithmetic intensity and the activation arithmetic intensity are similar to each other (the third condition).

In an embodiment, the final division value may be determined to increase the overall arithmetic intensity of the device based on the performance characteristics of the device. In addition, the final division value may be determined to achieve the lowest delay compared to the number of output channels or the number of input channels, based on the latency characteristics of the device.

For example, the final division value may be determined considering the latency characteristics such that the overall arithmetic intensity of the improved first convolutional layer is increased compared to that of the first convolutional layer.

In detail, according to the characteristic in which the weight arithmetic intensity and the activation arithmetic intensity serve as upper bounds of the overall arithmetic intensity, the final division value may be determined based on the division value that maximizes the overall arithmetic intensity, and the latency characteristics. Here, the weight arithmetic intensity and the activation arithmetic intensity according to the convolution model may refer to the weight arithmetic intensity and the activation arithmetic intensity according to at least one convolutional layer included in the convolution model, or the improved first convolutional layer.

Accordingly, the overall arithmetic intensity may be increased by tuning the weight arithmetic intensity and the activation arithmetic intensity through adjustment of the first convolutional layer based on the final division value. In other words, the overall arithmetic intensity may be adjusted such that the smaller of the weight arithmetic intensity and the activation arithmetic intensity is increased.

In an embodiment, the apparatus may obtain input data and generate output data through the convolution model that operates for the device, by using the input data.

The input data may be input to the convolution model to be reshaped and input, in the form of an input feature map, to the improved first convolutional layer. For example, the input feature map may be input to a first reshape layer to be described below. In other words, because the input feature map may be derived from the data input to the convolution model, the input feature map may be output in the form of an output feature map 550 through a convolution operation.

In an embodiment, among the plurality of convolutional layers, the improved first convolutional layer that satisfies preset conditions related to the latency characteristics of the device may perform a first convolution operation on the first feature map. For example, the first convolutional layer that satisfies the preset conditions may be a layer selected for applying the above-described final division value.

In an embodiment, the convolution model may further include a first reshape layer and a second reshape layer. Here, the first convolutional layer may be between the first reshape layer and the second reshape layer. That the first convolutional layer is between the first reshape layer and the second reshape layer may mean the first convolutional layer is directly connected to the first reshape layer and the second reshape layer, or that the first convolutional layer is indirectly connected to the first reshape layer and the second reshape layer (e.g., the first reshape layer, the first convolutional layer, and the second convolutional layer are connected to each other with other layers therebetween).

In an embodiment, the improved first convolutional layer may perform the first convolution operation on a first feature map 520 input to the improved first convolutional layer. Here, the first feature map 520 may be obtained by reshaping the input feature map of the improved first convolutional layer based on a predetermined final division value.

For example, assuming that a filter 530 whose size is adjusted to correspond to the first feature map 520 based on the final division value is a modified filter, the kernel weights of the modified filter 530 may have been adjusted based on the final division value to correspond to the number of channels of the first feature map 520, which is the input feature map of the improved first convolutional layer.

In an embodiment, the modified filter 530 may have a size obtained by dividing the size of the basic filter by the final division value. In detail, when the size of the basic filter used for a standard convolution operation is $C_{in}$, the size of the modified filter 530 may be $$\frac{C_{in}}{g}.$$

Here, the size of the modified filter 530 in the spatial direction may be equal to the size of the basic filter in the spatial direction.

In an embodiment, the first reshape layer may reshape a second feature map 510 input to the first reshape layer based on the final division value, to generate a feature map whose spatial size is greater than that of the second feature map 510, and number of input channels is less than that of the second feature map 510. In detail, the spatial size may be determined by the height and width of the feature map. For example, assuming that the final division value is g, the first reshape layer may reshape the second feature map 510 to generate a feature map whose spatial size is g times that of the second feature map 510 and number of input channels is 1/g times that of the second feature map 510.

In an embodiment, the second feature map 510 may be an input feature map.

Meanwhile, the feature map generated by the first reshape layer reshaping the second feature map 510 based on the final division value may be the first feature map 520 to be input to the improved first convolutional layer. In other words, an output from the first reshape layer may be an input to the improved first convolutional layer.

In an embodiment, the first reshape layer may generate first sub-feature maps 511 and 512 by dividing the second feature map 510 according to the final division value in the channel direction, and concatenate the generated first sub-feature maps 511 and 512 in the spatial direction to generate a feature map whose spatial size is greater than that of the second feature map 510, and number of input channels is less than that of the second feature map 510. For example, the feature map whose spatial size is greater than that of the second feature map 510, and number of input channels is less than that of the second feature map 510 may be the first feature map 520. Here, the channel direction may refer to a direction orthogonal to the space constituting the height and width of the feature map, and the spatial direction may refer to a direction parallel to the space constituting the height and width of the feature map. Thus, assuming that the final division value is g, the first reshape layer may generate the first feature map 520 by dividing the second feature map 510 into g first sub-feature maps 511 and 512 in the channel direction, and concatenating the g first sub-feature maps 511 and 512 in the spatial direction. Accordingly, as in the above embodiment, the apparatus may generate the first feature map 520 whose spatial size is g times that of the second feature map 510, and number of input channels is 1/g times that of the second feature map 510.

In an embodiment, a first output feature map output from the improved first convolutional layer may be a third feature map 540.

In an embodiment, the first output feature map output from the improved first convolutional layer may be reshaped based on the final division value to have the same size as a second output feature map output from the first convolutional layer. In detail, the reshaping of the first output feature map may include generating second sub-feature maps 541 and 542 by dividing the first output feature map in the spatial direction according to the final division value. In addition, the reshaping of the first output feature map may include concatenating the generated second sub-feature maps 541 and 542 in the channel direction. Accordingly, the output feature map 550 may be generated by reshaping the first output feature map. In an embodiment, the second reshape layer may generate the output feature map 550 by reshaping the third feature map 540 input to the second reshape layer based on the final division value.

For example, the second reshape layer may generate the second sub-feature maps 541 and 542 by dividing the third feature map 540 in the spatial direction according to the final division value. In addition, the second reshape layer may generate the output feature map 550 by concatenating the second sub-feature maps 541 and 542 in the channel direction.

In detail, assuming that the final division value is g, because g second sub-feature maps 541 and 542 respectively corresponding to g first sub-feature maps 511 and 512 are concatenated in the spatial direction, in contrast to that the first reshape layer divides the second feature map 510 into the g first sub-feature maps 511 and 512 in the channel direction and concatenates the g first sub-feature maps 511 and 512 in the spatial direction, the second reshape layer may divide the third feature map 540 into the g second sub-feature maps 541 and 542 in the spatial direction and concatenate the g second sub-feature maps 541 and 542 in the channel direction. As a result, the second reshape layer may generate the output feature map 550 by reshaping the third feature map 540.

Meanwhile, the feature map generated by the improved first convolutional layer performing the first convolution operation on the first feature map 520 based on the final division value may be the third feature map 540 to be input to the second reshape layer. In other words, an output from the improved first convolutional layer may be an input to the second reshape layer.

Figure 6:
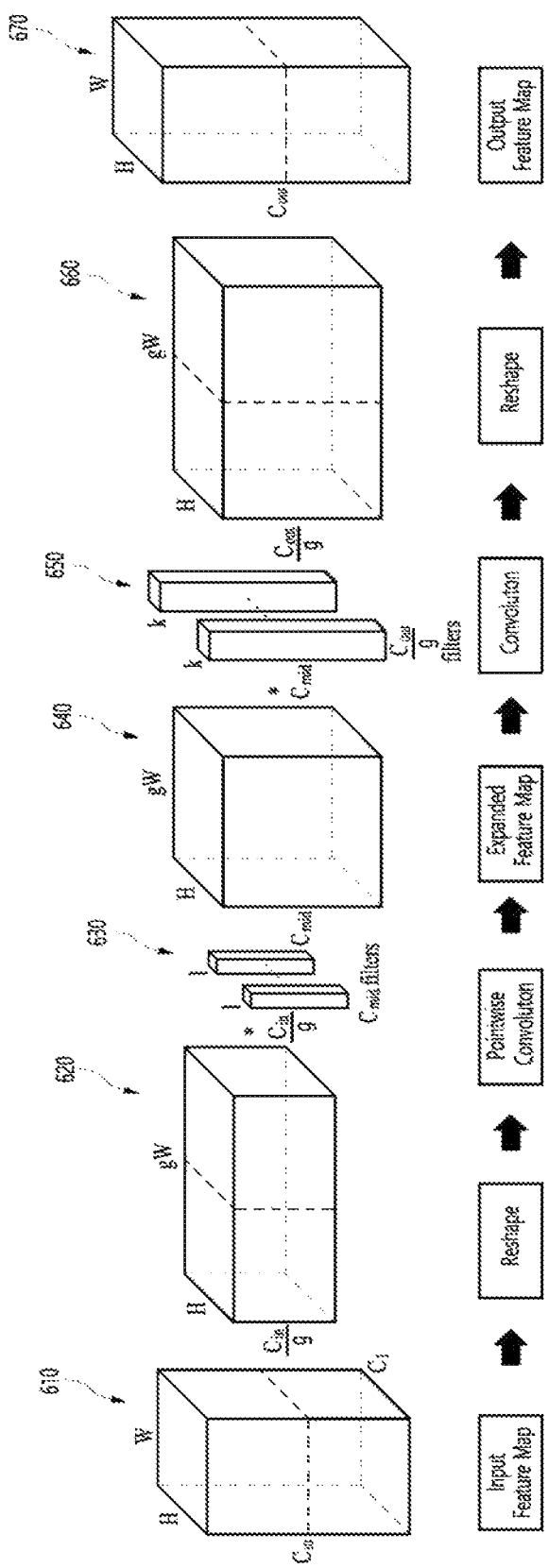
FIG. 6 is a diagram for describing a method of performing an expanded arithmetic intensity balanced convolution operation, according to an embodiment.

FIG. 6 is a diagram for describing a method of performing an ABConv-exp operation, according to an embodiment.

According to the method of performing an ABConv operation according to an embodiment described above with reference to FIG. 5, the amount of computation decreases in proportion to the division value, but as the size of the modified filter 530 decreases based on the division value, the representation power of the output feature map 550 inevitably decreases. Thus, the method of performing an ABConv-exp operation according to an embodiment suggests a convolution operation using a feature map having an extended number of channels by utilizing an additional convolutional layer in an operation process, such that the representation power of a convolution model is maintained.

Referring to FIG. 6, in a process of generating an output feature map 670 by an improved convolution model performing an operation on a second feature map 610, a fourth feature map 620, a filter 630 (hereinafter, referred to as a "first filter") whose size is adjusted to correspond to the fourth feature map 620, a first feature map 640 generated as a result of an intermediate convolution operation, a modified filter 650, a third feature map 660, and the output feature map 670 may be utilized, and the description of the fourth feature map 620 may be the same as the description of the first feature map 520 of FIG. 5, and the description of the modified filter 650 and the third feature map 660 may be the same as the description of the modified filter 530 and the third feature map 540 of FIG. 5.

In an embodiment, the convolution model may further include a second convolutional layer between the first reshape layer and the improved first convolutional layer. The second convolutional layer may perform the intermediate convolution operation between the fourth feature map 620 input to the second convolutional layer and the first filter 630 whose size is adjusted to correspond to the fourth feature map 620, to generate the first feature map 640 whose spatial size is equal to that of the feature map 620 and number of input channels is equal to an intermediate number of output channels. That is, the first feature map 640 may be generated to have an intermediate number of output channels, by performing the intermediate convolution operation on the fourth feature map 620. Here, the fourth feature map 620 may be a feature map generated by reshaping the second feature map 610 based on the final division value.

In an embodiment, the second feature map 610 may be an input feature map.

In an embodiment, the intermediate convolution operation may refer to a pointwise convolution operation. The pointwise convolution operation refers to an operation method that performs only a convolution operation in the channel direction without performing a convolution operation in the spatial direction. That is, the pointwise convolution operation is an operation method capable of compressing the features of the fourth feature map 620 into one channel by performing operations only on each channel by using the first filter 630 whose spatial size is fixed to 1×1, without extracting the spatial features of the fourth feature map 620. Thus, the spatial size of the first filter 630 may be 1×1.

In an embodiment, the first filter 630 may be a filter whose size in the channel direction is equal to a value obtained by dividing the size of a basic filter by the final division value. In detail, when the size of the basic filter used for a standard convolution operation is $C_{in}$, the size of the first filter 630 may be $$\frac{C_{in}}{g}.$$

Meanwhile, the first feature map 640 generated by the second convolutional layer performing the intermediate convolution operation on the fourth feature map 620 may be a first feature map to be input to the improved first convolutional layer. In other words, an output from the second convolutional layer may be an input to the improved first convolutional layer, and accordingly, the improved first convolutional layer may receive an input of the first feature map 640 from the second convolutional layer and generate a feature map with improved representation power compared to the embodiment of FIG. 5.

In an embodiment, the intermediate number of output channels of the first feature map 640 may be greater than the number of input channels of the fourth feature map 620. Accordingly, the amount of computation and the representation power may be kept similar to those of the standard convolution operation. In addition, the spatial size of the first feature map 640 may be equal to that of the fourth feature map 620.

In detail, the intermediate number of output channels of the first feature map 640 may be determined such that the sum of the amount of computation of the first convolution operation performed by the improved first convolution operation and the amount of computation of the intermediate convolution operation is equal to the amount of computation of the convolution operation performed by the first convolutional layer. Alternatively, the intermediate number of output channels may be determined such that the difference between the sum of the amount of computation of the first convolution operation and the amount of computation of the intermediate convolution operation, and the amount of computation of the convolution operation performed by the first convolutional layer is within a preset range. For example, the intermediate number of output channels $C_{mid}$ may be as shown in Equation 3 below.

$$C_{mid} = \frac{k^2 C_{in} C_{out}}{C_{in} + k^2 C_{out}} \quad \text{[Equation 3]}$$

In an embodiment, the description of a method, performed by the improved first convolutional layer, of generating the third feature map 660 by performing the first convolution operation between the first feature map 640 (or first feature map) and the modified filter 650 may be the same as the description of the method, performed by the improved first convolutional layer, of performing the first convolutional layer in the embodiment of FIG. 5. In addition, the description of a method, performed by the second reshape layer, of generating the output feature map 670 by reshaping the third feature map 660 may be the same as the description of the method, performed by the second reshape layer, of generating the output feature map 550 in the embodiment of FIG. 5. Thus, redundant descriptions will be omitted. However, the output feature map 670 generated by the method of performing an ABConv-exp operation according to an embodiment may be a feature map with improved according to an embodiment of the disclosure compared to the output feature map 550 of FIG. 5.

Figure 7:
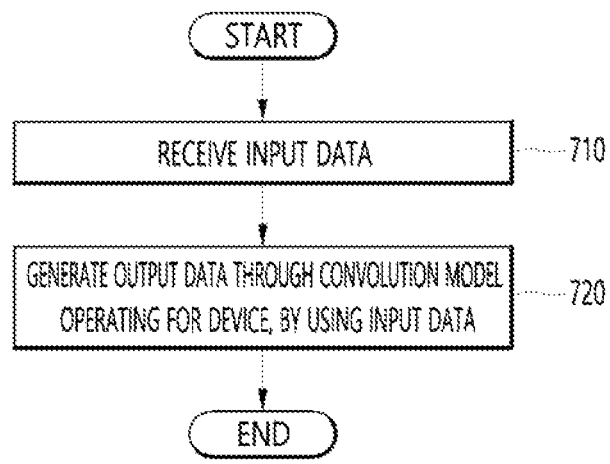
FIG. 7 is a flowchart of a method of performing an improved convolution operation, according to an embodiment.

FIG. 7 is a flowchart of a method of performing an improved convolution operation, according to an embodiment.

In operation 710, an apparatus may obtain input data.

In operation 720, the apparatus may generate output data through an improved model for a device, by using the input data. The apparatus may be the same as the device. Alternatively, the apparatus may be different from the device.

In an embodiment, the improved model may include a plurality of convolutional layers, and the plurality of convolutional layers may include an improved first convolutional layer that satisfies preset conditions related to the latency characteristics of the device.

In an embodiment, the improved first convolutional layer may be a layer obtained by adjusting a first convolutional layer to perform a first convolution operation on a first feature map. Here, the first feature map may be obtained by reshaping an input feature map of the first convolutional layer based on a predetermined final division value.

In an embodiment, the final division value may be determined considering the latency characteristics such that the overall arithmetic intensity of the improved first convolutional layer is increased compared to that of the first convolutional layer.

In an embodiment, the overall arithmetic intensity may be increased by tuning the weight arithmetic intensity and the activation arithmetic intensity of the overall arithmetic intensity through adjustment of the first convolutional layer based on the final division value.

In an embodiment, the tuning of the weight arithmetic intensity and the activation arithmetic intensity may mean increasing the smaller of the weight arithmetic intensity and the activation arithmetic intensity.

In an embodiment, the final division value may be determined based on a division value that maximizes the overall arithmetic intensity, and the latency characteristics.

In an embodiment, the latency characteristics may include a first latency characteristic for the number of output channels of the improved first convolutional layer, and a second latency characteristic for the number of input channels of the improved first convolutional layer.

In an embodiment, each of the first latency characteristic and the second latency characteristic may include a plurality of steps, each of which is a section of numbers of channels having the same latency within a step size. Meanwhile, the step size may depend on the hardware characteristic of the device.

In an embodiment, the preset conditions may include a first condition related to a first step size, which is the number of the plurality of steps included in the first latency characteristic, and the number of output channels, and a second condition related to a second step size, which is the number of the plurality of steps included in the second latency characteristic, and the number of input channels, wherein the first step size and the second step size depend on a hardware characteristic of the device.

In an embodiment, the first condition may be a condition that the number of output channels be divisible by the first step size, and the second condition may be a condition that the number of input channels be divisible by the second step size.

In an embodiment, the final division value may be determined to be a common divisor closest to an optimal division value among common divisors of a first quotient obtained by dividing the number of output channels of the first convolutional layer by the first step size, and a second quotient obtained by dividing the number of input channels of the first convolutional layer by the second step size.

In an embodiment, the optimal division value may be a division value that is determined as maximizing the overall arithmetic intensity.

In an embodiment, the preset conditions may include a third condition that the final division value not be 1.

In an embodiment, the first feature map may be generated by dividing the input feature map in the channel direction according to the final division value to generate first sub-feature maps, and concatenating the first sub-feature maps in the spatial direction.

In an embodiment, the spatial size of the first feature map may be as large as the spatial size of the input feature map multiplied by the final division value, and the number of input channels of the first feature map may be as small as the number of input channels of the input feature map divided by the final division value.

In an embodiment, the first output feature map output from the improved first convolutional layer may be reshaped to have the same size as that of the second output feature map, which is a feature map output from the first convolutional layer, based on the final division value.

In an embodiment, the first output feature map may be generated by dividing the feature map generated as a result of the first convolution operation, in the spatial direction according to the final division value to generate second sub-feature maps, and concatenating the second sub-feature maps in the channel direction.

In an embodiment, the spatial size of the feature map generated by reshaping the first output feature map may be equal to the spatial size of the first output feature map multiplied by the final division value, and the number of input channels of the feature map may be equal to the number of input channels of the first output feature map divided by the final division value.

In an embodiment, the first feature map may be generated to have an intermediate number of output channels, by reshaping the input feature map based on the final division value and performing an intermediate convolution operation on the reshaped input feature map.

In an embodiment, the intermediate number of output channels may be determined such that the difference between the sum of the amount of computation of the first convolution operation and the amount of computation of the intermediate convolution operation, and the amount of computation of the first convolution operation is within a preset range.

In an embodiment, the intermediate number of output channels may be determined such that the difference between the amount of computation of the intermediate convolution operation and the amount of computation of a convolution operation performed by the first convolutional layer is within a preset range.

In an embodiment, the spatial size of the first feature map may be equal to that of the reshaped input feature map, and the number of input channels of the first feature map may be greater than that of the reshaped input feature map.

Figure 8:
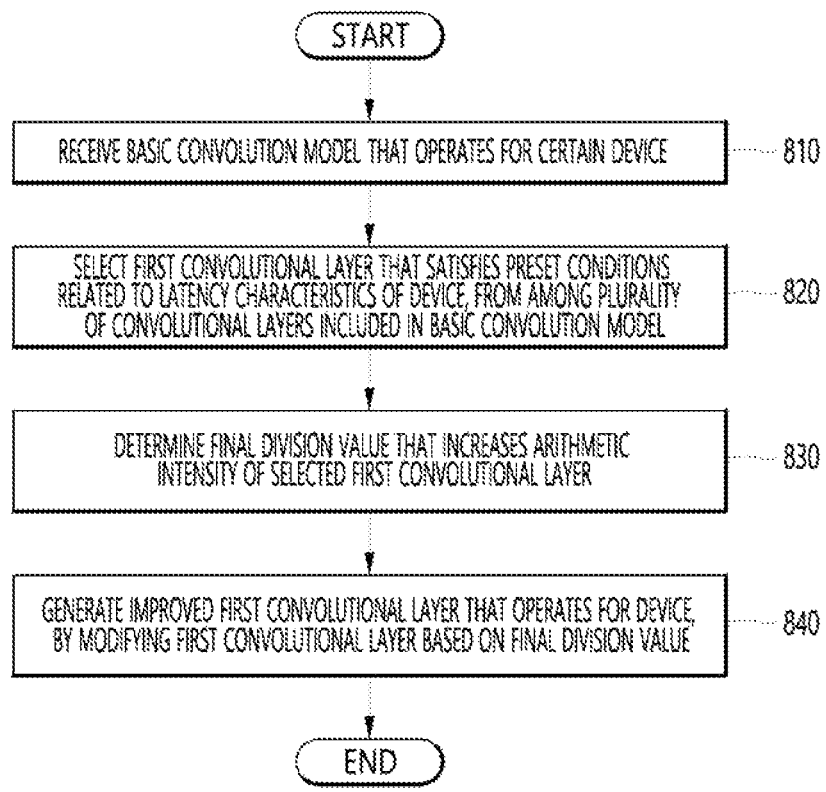
FIG. 8 is a flowchart of a method of generating an improved convolution model from a basic convolution model, according to an embodiment.

FIG. 8 is a flowchart of a method of generating an improved convolution model from a basic convolution model, according to an embodiment.

In operation 810, an apparatus may receive a basic convolution model that operates for certain device.

In an embodiment, the basic convolution model may include a plurality of convolutional layers.

In operation 820, the apparatus may select a first convolutional layer that satisfies preset conditions related to the latency characteristics of the device, from among the plurality of convolutional layers included in the basic convolution model.

In an embodiment, the latency characteristics may include a first latency characteristic for the number of output channels of the first convolutional layer, and a second latency characteristic for the number of input channels of the first convolutional layer.

In an embodiment, each of the first latency characteristic and the second latency characteristic may include a plurality of steps, each of which is a section of numbers of channels having the same latency within a step size.

In an embodiment, the preset conditions may include a first condition related to a first step size, which is the number of the plurality of steps included in the first latency characteristic, and the number of output channels, and a second condition related to a second step size, which is the number of the plurality of steps included in the second latency characteristic, and the number of input channels, wherein the first step size and the second step size depend on a hardware characteristic of the device.

In an embodiment, the first condition may be a condition that the number of output channels be divisible by the first step size, and the second condition may be a condition that the number of input channels be divisible by the second step size.

In operation 830, the apparatus may determine a final division value to be applied to the first convolutional layer.

In an embodiment, the final division value may be determined based on the latency characteristics such that the overall arithmetic intensity of an improved first convolutional layer is increased compared to that of the first convolutional layer.

In an embodiment, the final division value may be determined based on a division value that maximizes the overall arithmetic intensity, and the latency characteristics.

In an embodiment, the apparatus may determine the final division value to be a common divisor closest to an optimal division value among common divisors of a first quotient obtained by dividing the number of output channels of the first convolutional layer by the first step size, and a second quotient obtained by dividing the number of input channels of the first convolutional layer by the second step size.

In an embodiment, the optimal division value may be a division value that is determined as maximizing the overall arithmetic intensity.

In operation 840, the apparatus may generate the improved first convolutional layer that performs a convolution operation on a first feature map, by modifying the first convolutional layer based on the final division value.

In an embodiment, the overall arithmetic intensity may be increased by tuning the weight arithmetic intensity and the activation arithmetic intensity of the overall arithmetic intensity through the modifying of the first convolutional layer based on the final division value.

For example, the tuning of the weight arithmetic intensity and the activation arithmetic intensity of the overall arithmetic intensity may be increasing the smaller of the weight arithmetic intensity and the activation arithmetic intensity.

In an embodiment, the first feature map may be obtained by dividing the input feature map based on the final division value.

In an embodiment, the first feature map may be generated by dividing the input feature map in the channel direction according to the final division value to generate first sub-feature maps, and concatenating the first sub-feature maps in the spatial direction.

In an embodiment, the spatial size of the first feature map may be as large as the spatial size of the input feature map multiplied by the final division value, and the number of input channels of the first feature map may be as small as the number of input channels of the input feature map divided by the final division value.

In an embodiment, based on the final division value, a first output feature map output from the improved first convolutional layer may be reshaped to have the same size as that of a second output feature map, which is a feature map output from the first convolutional layer.

In an embodiment, the reshaping of the first output feature map may include generating second sub-feature maps by dividing the first output feature map in the spatial direction according to the final division value, and concatenating the second sub-feature maps in the channel direction.

In an embodiment, the spatial size of a feature map generated by reshaping the first output feature map may be equal to the spatial size of the first output feature map multiplied by the final division value, and the number of input channels of the feature map may be equal to the number of input channels of the first output feature map divided by the final division value.

In an embodiment, the first feature map may be generated to have an intermediate number of output channels, by performing an intermediate convolution operation on the input feature map reshaped based on the final division value.

In an embodiment, the intermediate convolution operation may be a pointwise convolution operation that performs only a convolution operation in the channel direction without performing a convolution operation in the spatial direction.

In an embodiment, the intermediate number of output channels may be determined such that the sum of the amount of computation of the first convolution operation and the amount of computation of the intermediate convolution operation is equal to the amount of computation of a convolution operation performed by the first convolutional layer.

In an embodiment, the spatial size of the first feature map may be equal to that of the reshaped input feature map, and the number of input channels of the first feature map may be greater than that of the reshaped input feature map.

In an embodiment, when the determined final division value is not 1, the apparatus may generate the improved first convolutional layer.

In an embodiment, the apparatus may generate an improved convolution model including the improved first convolutional layer.

The description of the improved model of FIG. 7 may be applied, as it is, to the improved convolution model of FIG. 8. Accordingly, the descriptions provided above with reference to FIG. 7 may be applied, as they are, to a method of selecting at least one convolutional layer, the arithmetic intensity, the division value, the modified filter, the improved convolution operation, and the preset conditions. Thus, redundant descriptions will be omitted.

Figure 9:
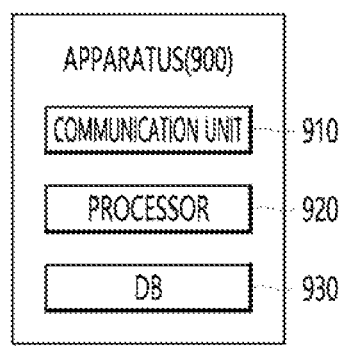
FIG. 9 is a block diagram of an apparatus for performing a convolution operation for optimizing the arithmetic intensity of device, according to an embodiment.

FIG. 9 is a block diagram of an apparatus for performing a convolution operation for optimizing the arithmetic intensity of device, according to an embodiment.

Referring to FIG. 9, an apparatus 900 may include a communication unit 910, a processor 920, and a database (DB) 930. FIG. 9 illustrates the apparatus 900 including only the components related to an embodiment. Therefore, it would be understood by those of skill in the art that other general-purpose components may be further included in addition to those illustrated in FIG. 9.

The communication unit 910 may include one or more components for performing wired/wireless communication with an external server or an external device. For example, the communication unit 910 may include at least one of a short-range communication unit (not shown), a mobile communication unit (not shown), and a broadcast receiver (not shown). In an embodiment, the communication unit 910 may obtain input data having a certain height, a certain width, and a certain number of input channels. In another embodiment, the communication unit 910 may obtain a first latency characteristic for an output channel and a second latency characteristic for an input channel, according to hardware characteristics of certain device, and obtain the number of input channels and the number of output channels of each of a plurality of layers included in a certain convolution model implemented in certain device.

The DB 930 is device for storing various pieces of data processed by the apparatus 900, and may store a program for the processor 920 to perform processing and control.

The DB 930 may include random-access memory (RAM) such as dynamic RAM (DRAM) or static RAM (SRAM), read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 920 controls the overall operation of the apparatus 900. For example, the processor 920 may execute programs stored in the DB 930 to control the overall operation of an input unit (not shown), a display (not shown), the communication unit 910, the DB 930, and the like. The processor 920 may execute programs stored in the DB 930 to control the operation of the apparatus 900.

The processor 920 may control at least some of the operations of the apparatus for performing a convolution operation described above with reference to FIGS. 1 to 8.

The processor 920 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the apparatus 900 may be a server. The server may be implemented as a computer device or a plurality of computer devices that provide a command, code, a file, content, a service, and the like by performing communication through a network. The server may receive data necessary for performing a convolution operation and perform the convolution operation based on the received data.

Meanwhile, embodiments of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skilled in the art of computer software. Examples of the computer program may include not only machine code, such as code made by a compiler, but also high-level language code that is executable by a computer by using an interpreter or the like.

According to an embodiment, the method according to various embodiments of the present disclosure may be included in a computer program product and provided. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or exemplary language provided herein, is intended merely to better illuminate the present disclosure and does not pose a limitation on the scope of the present disclosure unless otherwise claimed. In addition, various modifications, combinations, and adaptations will be readily apparent to those skill in the art without departing from the following claims and equivalents thereof.

Accordingly, the spirit of the present disclosure should not be limited to the above-described embodiments, and all modifications and variations which may be derived from the meanings, scopes and equivalents of the claims should be construed as failing within the scope of the present disclosure.

According to an embodiment of the present disclosure, it is possible to provide a convolution model that improves the performance and latency efficiency of device by applying the maximum value for the arithmetic intensity of the device.

In addition, according to an embodiment of the present disclosure, it is possible to provide a convolution model that reduces the amount of computation or increases device efficiency compared to the same amount of computation.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of performing a convolution operation in a neural network, which is performed by an apparatus, the method comprising:
   receiving input data; and
   generating output data through a convolution model of the neural network for a device, by using the input data,
   wherein the convolution model comprises a plurality of convolutional layers, a first reshape layer,
   wherein the plurality of convolutional layers comprise an improved first convolutional layer that satisfies preset conditions related to latency characteristics of the device,
   wherein the improved first convolutional layer is a layer obtained by-modifying a first convolutional layer, which performs a first convolution operation on an input feature map, using a base filter, to include a modified filter modified from the base filter of the first convolutional layer based on a predetermined final division value, and to perform a second convolution operation on a first feature map, which is modified by dividing the input feature map based on a predetermined final division value,
   wherein the first reshape layer is positioned before the improved first convolution layer and modifies the input feature map to generate the first feature map having an increased spatial size and a reduced number of input channels according to the final division value, compared to the input feature map, wherein the improved first convolutional layer performs the second convolution operation on the first feature map, using the modified filter, sharing weights of the modified filter over the first feature map, and
   wherein the final division value is determined by considering the latency characteristics such that an overall arithmetic intensity of the improved first convolutional layer is increased compared to the first convolutional layer.

2. The method of claim 1, wherein the overall arithmetic intensity is increased by tuning a weight arithmetic intensity and an activation arithmetic intensity of the overall arithmetic intensity through the modifying of the first convolutional layer based on the final division value.

3. The method of claim 2, wherein the tuning the weight arithmetic intensity and the activation arithmetic intensity comprises increasing the smaller of the weight arithmetic intensity and the activation arithmetic intensity.

4. The method of claim 2, wherein the final division value is determined based on a division value that maximizes the overall arithmetic intensity, and the latency characteristics.

5. The method of claim 1, wherein the latency characteristics comprise a first latency characteristics related to common divisors of a first quotient obtained by dividing a number of output channels of the first convolutional layer by a number of first steps and a second quotient obtained by dividing a number of input channels of the first convolutional layer by a number of second steps, wherein
   the number of first steps and the number of second steps are sizes of a plurality of steps having a same latency value within each step according to latency characteristics for output channels of the plurality of convolutional layers and latency characteristics for input channels of the plurality of convolutional layers.

6. The method of claim 5, wherein the preset conditions comprise:
   a first condition related to the number of output channels and the number of first steps; and
   a second condition related to the number of input channels and the number of second steps.

7. The method of claim 6, wherein the first condition is a condition that the number of output channels be divisible by the number of first steps, and
   the second condition is a condition that the number of input channels be divisible by the number of second steps.

8. The method of claim 5, wherein
   the final division value is determined to be a common divisor closest to an optimal division value among common divisors, wherein the optimal division value is a division value that is determined to maximize the overall arithmetic intensity, wherein the preset conditions comprise a third condition that the final division value not be 1.

9. The method of claim 1, wherein
   the improved first convolutional layer is located between the first reshape layer and a second reshape layer, wherein
   the second reshape layer generates an output feature map by modifying a third feature map input to the second reshape layer based on the final division value.

10. The method of claim 9, wherein the first reshape layer generates the first feature map having the increased spatial size and the reduced number of input channels by dividing the input feature map in a channel direction according to the final division value to generate first sub-feature maps and concatenating the first sub-feature maps in a spatial direction.

11. The method of claim 10, wherein the second reshape layer generates the output feature map by dividing the third feature map in a spatial direction based on the final division value to generate second sub-feature maps and concatenating the second sub-feature maps in a channel direction.

12. The method of claim 9, wherein
   the convolution model further comprises a second convolutional layer located between the first reshape layer and the improved first convolutional layer, wherein
   the second convolutional layer performs an intermediate convolution operation on a fourth feature map input to the second convolutional layer to generate a feature map whose spatial size is equal to a spatial size of the fourth feature map and number of input channels is equal to an intermediate number of output channels, and
   the intermediate convolution operation performs only a convolution operation in a channel direction without performing a convolution operation in a spatial direction.

13. An apparatus for performing a convolution operation in a neural network, the apparatus comprising:
   a memory storing at least one program; and
   a processor configured to perform an operation by executing the at least one program, wherein the processor is further configured to receive input data and generate output data through a convolution model of the neural network for a device, by using the input data, wherein the convolution model comprises a plurality of convolutional layers, a first reshape layer, and a second reshape layer, wherein the plurality of convolutional layers comprise an improved first convolutional layer that satisfies preset conditions related to latency characteristics of the device, wherein the improved first convolutional layer is a layer obtained by-modifying a first convolutional layer, which performs a first convolution operation on an input feature map, using a base filter, to include a modified filter modified from the base filter of the first convolutional layer based on a predetermined final division value, and to perform a second convolution operation on a first feature map, which is modified by dividing the input feature map based on a predetermined final division value, wherein the first reshape layer is positioned before the improved first convolution layer and modifies the input feature map to generate the first feature map having an increased spatial size and a reduced number of input channels according to the final division value, compared to the input feature map, wherein the improved first convolutional layer performs the second convolution operation on the first feature map, using the modified filter, sharing weights of the modified filter over the first feature map, and wherein the final division value is determined by considering the latency characteristics such that an overall arithmetic intensity of the improved first convolutional layer is increased compared to the first convolutional layer.

14. A method of generating a convolution model of a neural network, the method comprising:
receiving a basic convolution model operating in a certain device;
selecting, among a plurality of convolutional layers included in the basic convolution model, a first convolutional layer that satisfies preset conditions related to latency characteristics of the device;
determining a final division value to be applied to the selected first convolutional layer;
modifying the first convolutional layer based on the final division value to generate an improved first convolutional layer that performs a convolution operation on an input feature map which is modified by dividing an input feature map based on the final division value and the convolution operation is performed on the input feature map using a base filter, to include a modified filter modified from the base filter of the first convolutional layer based on a predetermined final division value, and to perform a second convolution operation on a first feature map; and
outputting a convolution model generated from the basic convolution model to include the improved first convolutional layer,
wherein a first reshape layer is positioned before the improved first convolution layer and modifies the input feature map to generate the first feature map having an increased spatial size and a reduced number of input channels according to the final division value, compared to the input feature map, wherein the improved first convolutional layer performs the second convolution operation on the first feature map, using the modified filter, sharing weights of the modified filter over the first feature map, and wherein the final division value is determined by considering the latency characteristics such that an overall arithmetic intensity of the improved first convolutional layer is increased compared to the first convolutional layer.

15. The method of claim 14, wherein the overall arithmetic intensity is increased by tuning a weight arithmetic intensity and an activation arithmetic intensity of the overall arithmetic intensity through the modifying of the first convolutional layer based on the final division value.

16. The method of claim 14, wherein
the preset conditions comprise
a first condition related to a number of output channels and a number of first steps, and a second condition related to a number of input channels and a number of second steps, wherein
the number of first steps and the number of second steps are sizes of a plurality of steps having a same latency value according to latency characteristics for output channels of the plurality of convolutional layers and latency characteristics for input channels of the plurality of convolutional layers.

17. The method of claim 16, wherein the determining the final division value comprises determining the final division value to be a common divisor closest to an optimal division value among common divisors of a first quotient obtained by dividing the number of output channels by the number of first steps and a second quotient obtained by dividing the number of input channels by the number of second steps, wherein the optimal division value is a division value that is determined to maximize the overall arithmetic intensity.

18. The method of claim 17, wherein the generating the improved first convolutional layer comprises generating the improved first convolutional layer when the determined final division value is not 1.

19. The method of claim 14, wherein
the improved first convolutional layer is located between the first reshape layer and a second reshape layer, wherein
the second reshape layer generates an output feature map by modifying a third feature map input to the second reshape layer based on the final division value.

20. The method of claim 19, wherein the output convolution model further comprises
a second convolutional layer located between the first reshape layer and the improved first convolutional layer, wherein
the second convolutional layer performs an intermediate convolution operation between a fourth feature map input to the second convolutional layer and a filter whose size is adjusted to correspond to the fourth feature map to generate a feature map whose spatial size is equal to a spatial size of the fourth feature map and number of input channels is equal to an intermediate number of output channels, and
the intermediate convolution operation performs only a convolution operation in a channel direction without performing a convolution operation in a spatial direction.

* * * * *